United States Patent [19]

Tsutsumitake et al.

[11] Patent Number: 4,964,064

[45] Date of Patent: Oct. 16, 1990

[54] METHOD AND APPARATUS FOR CONSTRAINT-ORIENTED INFERENCE

[75] Inventors: Hideyuki Tsutsumitake; Tetsuro Muranaga, both of Yokohama, Japan; Takashi Moriyasu, Edinburgh, United Kingdom

[73] Assignee: Kabushiki Kaisha Toshiba, Kawasaki, Japan

[21] Appl. No.: 244,899

[22] Filed: Sep. 15, 1988

[30] Foreign Application Priority Data

Sep. 26, 1987 [JP] Japan .................... 62-241361

[51] Int. Cl.[5] .................. G09C 15/00; G10C 15/00; G06F 15/24; G09B 7/12
[52] U.S. Cl. .................. 364/513; 364/200; 364/900
[58] Field of Search ........... 364/513, 200 MS File, 364/900 MS File

[56] References Cited

U.S. PATENT DOCUMENTS

| | | |
|---|---|---|
| 4,642,782 | 2/1987 | Kemper et al. ............ 364/513 |
| 4,648,044 | 3/1987 | Hardy et al. ............ 364/900 |
| 4,670,848 | 6/1987 | Schramm ............ 364/513 |
| 4,675,829 | 6/1987 | Clemenson ............ 364/513 |
| 4,803,642 | 2/1988 | Muranaga ............ 364/900 |
| 4,853,873 | 8/1989 | Tsuji et al. ............ 364/513 |

Primary Examiner—Jerry Smith
Assistant Examiner—Jim Trammell
Attorney, Agent, or Firm—Foley & Lardner, Schwartz, Jeffery, Schwaab, Mack, Blumenthal & Evans

[57] ABSTRACT

A method and an apparatus for constraint-oriented inference provides improved knowledge base formation efficiency and an ability to maintain consistency among slots. Constraints indicating relationships among slot values of frames are stored collectively, pointers which make the constraints accessible by relevant slots are attached automatically, and the constraints are simplified by inserting slot values determined by processes of inference.

10 Claims, 5 Drawing Sheets

```
┌─ block-constraint #1 ──────────────┐
│                                     │
│     [ block A    y-coord    ? y1 ] │
│   ∧ [ block B    y-coord    ? y2 ] │
│   ∧ ( ? y2  =  ? y1 + 15 )         │
│                                     │
└─────────────────────────────────────┘
```

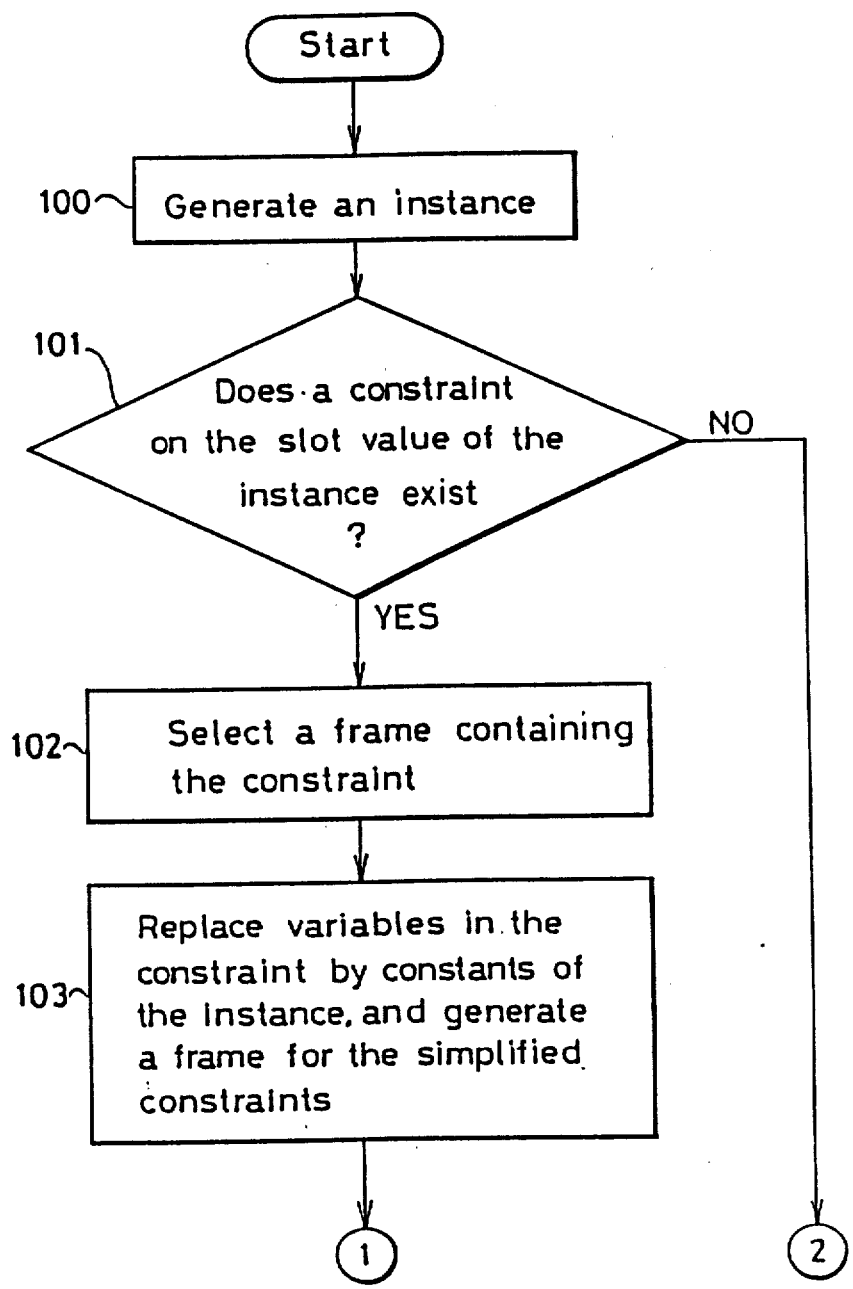

METHOD AND APPARATUS FOR CONSTRAINT-ORIENTED INFERENCE

BACKGROUND OF THE INVENTION

1 Field of the Invention

The present invention relates to method and apparatus for an inference using frame-based knowledge representation, primarily utilized in the artificial intelligence technology, where various knowledge on an object of interest are collectively stored in a frame, and an inference utilizes a hierarchical data structure formed by frames interactively and, more particularly, to method and apparatus for a constraint-oriented inference where a particular slot value of a slot of a frame is deduced from constraints imposed on slot values and their mutual relationships.

2. Description of the Prior Art

A method known as frame-based knowledge representation is suitable for representing knowledge on an object of interest in a flexible manner which allows easy access and management of the knowledge.

In this frame-based knowledge representation, an object is represented by a frame comprised of slot-slot value pairs. Each slot represents a categorized attribute and each slot value represents an attribute value corresponding to the object.

In such frame-based knowledge representation, if a slot value of a particular slot of a frame required was not found, or if a slot whose slot value is required does not exist in a frame, a slot value of a corresponding slot belonging to a frame representing a broader concept of the concept represented by the frame in question will be inherited as the slot value of the frame in question, or the slot value required will be deduced from prescribed rules accompanying the slot.

On the other hand, in a method known as constraint-oriented inference, constraints indicating relationship among the slot values of different frames are imposed so that a missing slot value of a frame can be derived from the constraints and other known slot values of the other frames. For example, let R(V1, V2) be a constraint imposed on a slot value V1 of a slot S1 in a frame F1 and a slot value V2 of a slot S2 in a frame F2, where the relation R(V1, V2) defines V1 in terms of V2, or vice versa. And suppose V1 is not known while V2 is known. Then if V1 of S1 in F1 was required, it will be derived from R(V1, V2) and V2 of S2 in F2. Obviously, the opposite situation can be handled by the same relation R(V1, V2).

In such constraint-oriented inference, it is necessary to provide means to make constraints accessible by slots so that constraints can be accessed by all relevant slots. For instance, in the last example, a constraint R(V1, V2) must be accessed by both S1 in F1 and S2 in F2.

Conventionally, either an operator has to make constraints accessible by slots by attaching pointers which provide paths for access to each relevant slot of given constraints, or else it is necessary to accompany each slot with a pattern for searching constraints to which it is relevant and carry out searching by pattern matching.

However, in the conventional methods there are problems such as the low efficiency in knowledge base formation and the insufficient ability to maintain consistency among slots. In particular, when many slots are relevant to one constraint, the process of making each of these slots accessible to the constraint can be quite complex, and if the need for correction arises, the process of correcting can be very cumbersome.

SUMMARY OF THE INVENTION

It is therefore an object of the present invention to provide a method for constraint-oriented inference with improved efficiency in knowledge base formation and an ability to maintain consistency among slots.

Another object of the present invention is to provide an apparatus to perform a method of the present invention.

According to one aspect of the present invention there is provided an apparatus for constraint-oriented inference comprising knowledge base means including frames comprised of slots and slot values for storing knowledge on objects of interest, each object being represented by a frame, each categorized attribute being represented by a slot in the frame, a particular attribute value corresponding to the object being represented by a slot value in the frame, and constraints indicating relationships among slot values of different frames stored collectively in a part of the knowledge base means; and constraints managing means for regulating the constraints, and for selecting frames and slots relevant to each constraint and attaching a pointer to each of the selected slots to make the constraint accessible by the slots.

According to another aspect of the present invention there is provided an apparatus for constraint-oriented inference comprising knowledge base means including frames comprised of slots and slot values for storing knowledge on objects of interest, each object being represented by a frame, each categorized attribute being represented by a slot in the frame, a particular attribute value corresponding to the object being represented by a slot value in the frame, and constraints indicating relationships among slot values of different frames stored collectively in a part of the knowledge base means; and constraints managing means for regulating the constraints, and for selecting frames and slots relevant to each constraint and attaching a pointer to each of the selected slots to make the constraint accessible by the slots, and for generating simplified constraints in which the slot values determined utilizing process of inference are inserted.

According to another aspect of the present invention there is provided a method of constraint-oriented inference comprising the steps of: (a) representing each object of interest by a frame; (b) representing each categorized attribute and corresponding attribute value of an object by a slot and its slot value in the frame representing the object; (c) storing constraints indicating relationships among slot values of different frames collectively in a part of knowledge base; (d) regulating the constraints and selecting frames and slots relevant to each constraint and attaching a pointer to each of the selected slots to make the constraint accessible by the slots, all automatically; and (e) deducing an answer to a question imposed by utilizing frames, slots and constraints interactively.

According to another aspect of the present invention there is provided a method of constraint-oriented inference comprising the steps of: (a) representing each object of interest by a frame; (b) representing each categorized attribute and corresponding attribute value of an object by a slot and its slot value in the frame representing the object; (c) storing constraints indicating relationships among slot values of different frames collectively in a part of knowledge base; (d) regulating the constraints and selecting frames and slots relevant to each constraint and attaching a pointer to each of the selected slots to make the constraint accessible by the slots, all automatically; (e) deducing an answer to a question imposed by utilizing frames, slots and constraints interactively; and (f) generating simplified constraints by inserting the slot values determined utilizing a process of inference.

Other features and advantages of the present invention will become apparent from the following description taken in conjunction with the accompanying drawings.

BRIEF DESCRIPTION OF THE DRAWINGS

FIGS. 6a and 6b is a flow-chart for performing an inference using the apparatus of FIG. 1.

DETAILED DESCRIPTION OF THE PREFERRED EMBODIMENTS

Figure 1:
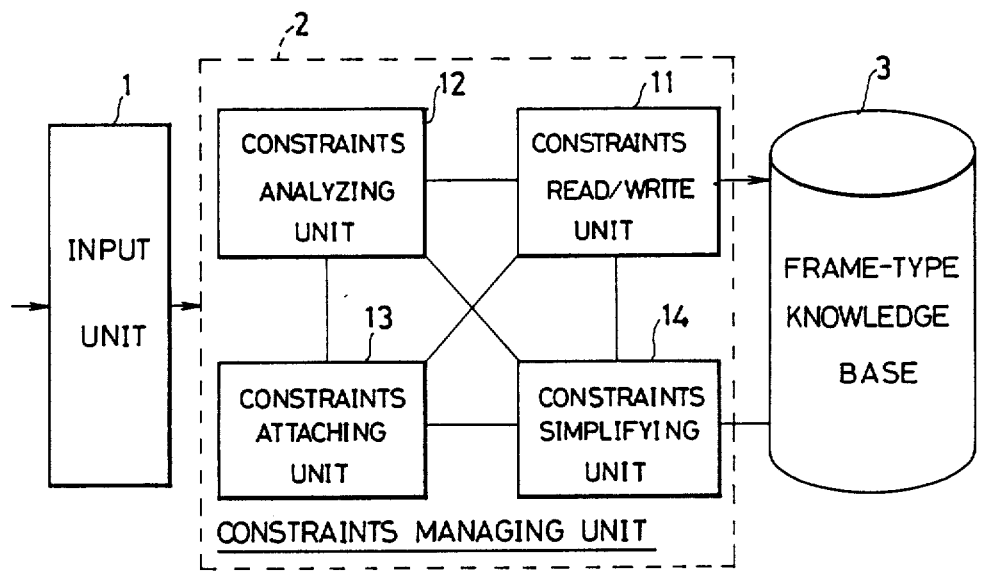
FIG. 1 is a block diagram of one embodiment of an apparatus for constraint-oriented inference according to the present invention.

Referring now to FIG. 1, there is shown one embodiment of an apparatus for constraint-oriented inferences according to the present invention.

In this embodiment, the apparatus is comprised of an input unit 1; a constraints managing unit 2 including a constraints read/write unit 11, a constraints analyzing unit 12, a constraints attaching unit 13, and a constraints simplifying unit 14; and a frame-type knowledge base 3.

The input unit 1 is used to feed information necessary for creation or modifications of constraints or frames. A constraint entered at the input unit 1 is transmitted to the constraints managing unit 2. In the constraints managing unit 2, the constraints read/write unit 11 writes constraints entered at the input unit 1 in the frame-type knowledge base 3 in the form of frames, and reads out constraints stored in the frame-type knowledge base 3 required for inferences. The constraints analyzing unit 12 analyzes a constraint readout by the constraints read/write unit 11 and derives all relevant frames and slots for that constraint. The constraints attaching unit 13 attaches pointers for accessing the constraint to these frames and slots derived by the constraint analyzing unit 12. The constraint simplifying unit 14 simplifies the constraint when a particular slot value of a slot of a frame relevant to the constraint is given.

An operation for processing inference in this apparatus will now be explained for an exemplary situation referring to FIGS. 2, 3, 4 and 5.

So as an example, consider an inference for two cubes one on top of the other using a constraint regarding the height and y-component of cubes. This constraint is shown diagrammatically in FIG. 2, where it is represented by a frame called 'block-constraint' (A box represents a frame in the FIG. 3). The left hand side of the arrow is a condition and the right hand side of the arrow shows relationships to be satisfied by various slot values when the condition is satisfied. In other words, the left hand side can be considered as a slot value of an 'if' slot and the right hand side can be considered a slot value of an 'then ' slot. The square bracket of the form

| [FRAME | SLOT | SLOT VALUE] |
| --- | --- | --- | means FRAME has the relation SLOT with SLOT VALUE, and those preceded by ? such as '? block 1' or '? y1' are variables. In particular, '? block 1' and '? block 2' are to correspond to instances of a frame 'Block'. A slot 'y-coord' indicates the coordinate of the bottom of the block in the direction of the height. The constraint of FIG. 2 thus means 'if a block 1 is on top of a block 2, then the y-coordinate y2 of the block 2 is a sum of the y-coordinate y1 and the height $\underline{h}$ of the block 1'. With this constraint, the y-component of the block 2 can be deduced from knowledge of the y-component and the height of the block 1.

When this constraint is entered at the input unit 1, it will be stored in the frame-type knowledge base 3 and will be given to the constraints analyzing unit 12 from the constraints read/write unit 11 at the same time. The constraints analyzing unit 12 derives relevant frames and slots from the right hand side of the constraint, which in this case are frame-slot pairs (Block y-coord) and (Block height) as '? block 1' and '? block 2' are variables for instances of the frame 'Block' as mentioned above.

Figure 3:
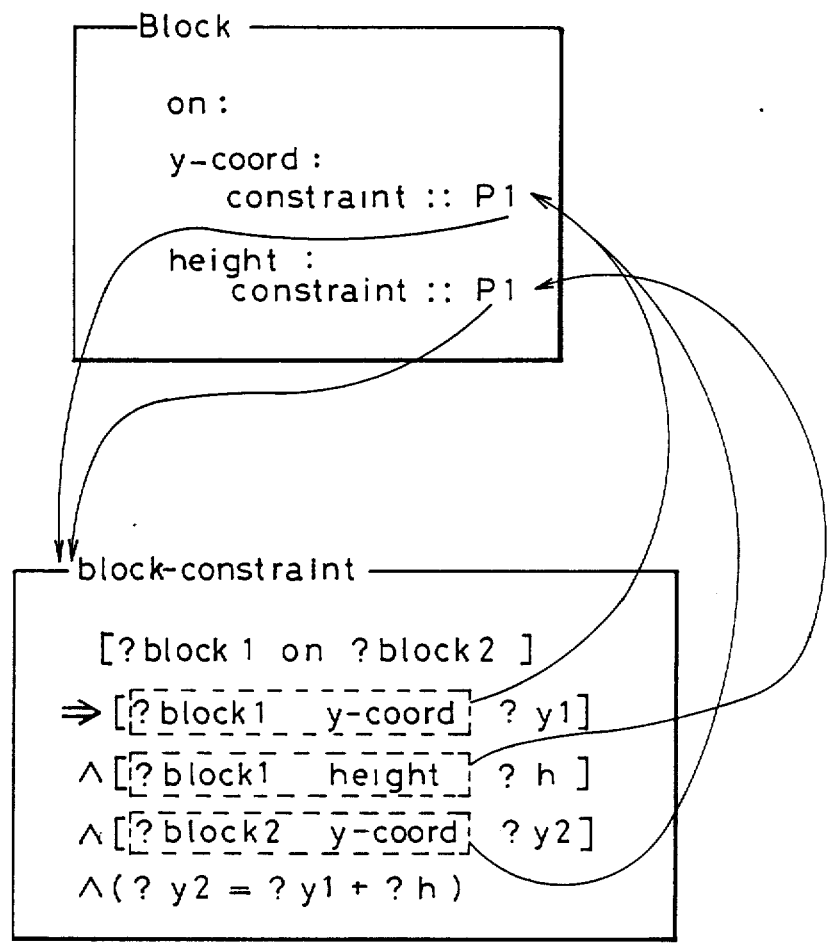
FIG. 3 is a diagram for explaining the constraints in the apparatus of FIG. 1.

Then the constraints attaching unit 13 attaches a pointer P1 for accessing the frame 'block-constraint' to constraint facets of the slot 'y-coord' and the slot 'height' of the frame 'Block', as is shown in FIG. 3 where the arrows from the frame 'block-constraint' to the frame 'Block' correspond to P1. So if a slot value of either the slot 'y-coord' or the slot 'height' were missing from an instance of the frame 'Block', it can be deduced by following the arrows from the frame 'Block' to the frame 'block-constraint' using the constraint.

Now when instances of the frame 'Block' represented by a frame 'block A' and a frame 'block B' are entered at the input unit 1, they will be stored in the frame-type knowledge base 3 and will be given to the constraints simplifying unit 14 from the constraints read/write unit 11 at the same time. The constraints simplifying unit 14 looks for a frame representing a broader concept of the concepts represented by the newly entered frames, and by means of a pointer attached to each relevant slot in that frame for the broader concept, reads the constraint and applies it to the newly entered frames in order to simplify them. Namely, if a slot value of a slot 'on' of the frame 'block A' is 'block B' and if a slot value of a slot 'height' of the frame 'block A' is '15', then

Figure 2:
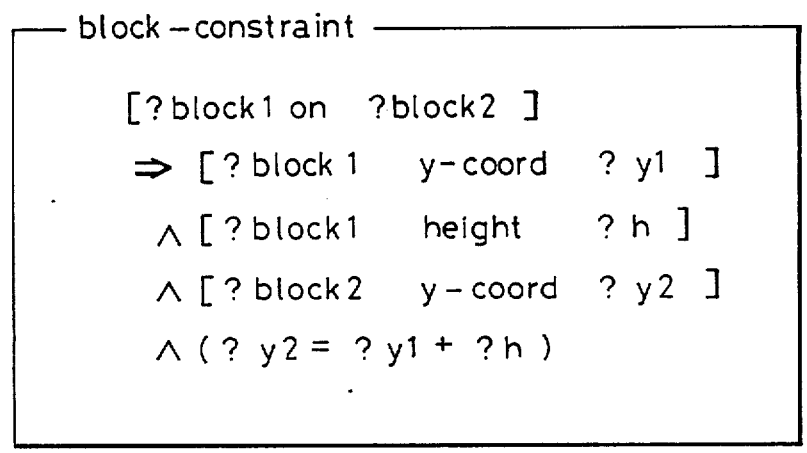
FIG. 2 is a diagram for explaining the constraints in the apparatus of FIG. 1.

| [? block 1 | on | ? block 2] |
| --- | --- | --- |
| [? block 1 | height | ? h] | in FIG. 2 can be replaced by

Figures 4, 5:
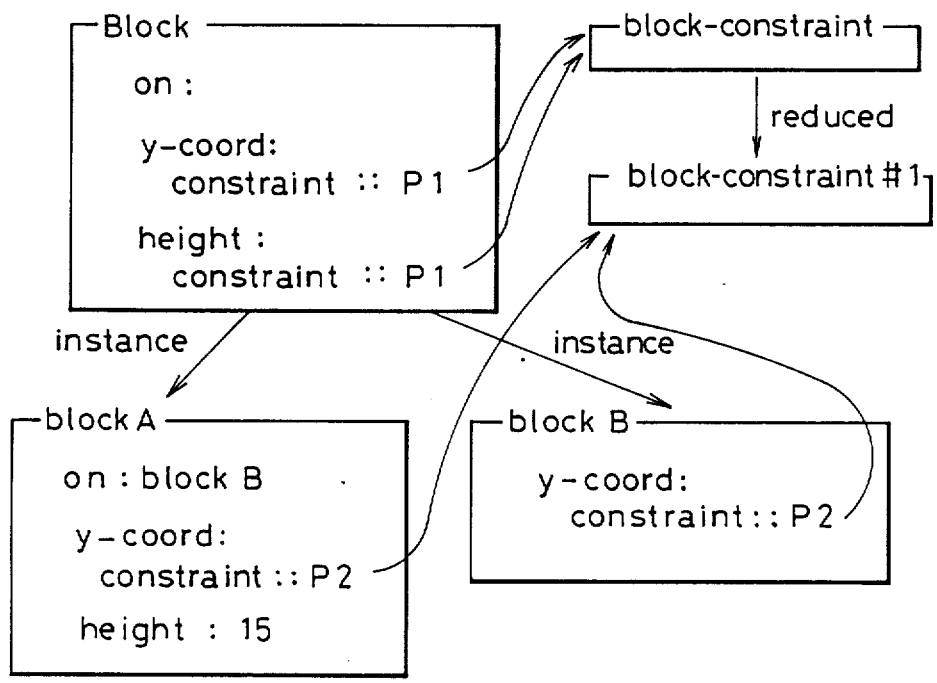
FIG. 4 is a diagram for explaining the constraints in the apparatus of FIG. 1.
FIG. 5 is a diagram for explaining the constraints in the apparatus of FIG. 1.

| [block A | on | block B] |
| --- | --- | --- |
| [block A | height | 15] | so that the constraint of FIG. 2 can be simplified to the one shown in FIG. 4.

This simplified constraint will be stored in the frame-type knowledge base 3 as a frame 'block-constraint #1' and at the same time will go through the process of attaching pointers similar to that explained above for the frame 'block-constraint' as shown in FIG. 5. Namely, in the constraint facets of the slot 'y-coord' of each instance 'block A' and 'block B' of the frame 'Block', a pointer P2 for accessing the constraint 'block-constraint #1' is attached. Thus if a slot value of the slot 'y-coord' of either 'block A' or 'block B' is needed to be inferred, the simplified constraint 'block-constraint #1' will be used.

Figure 6B:
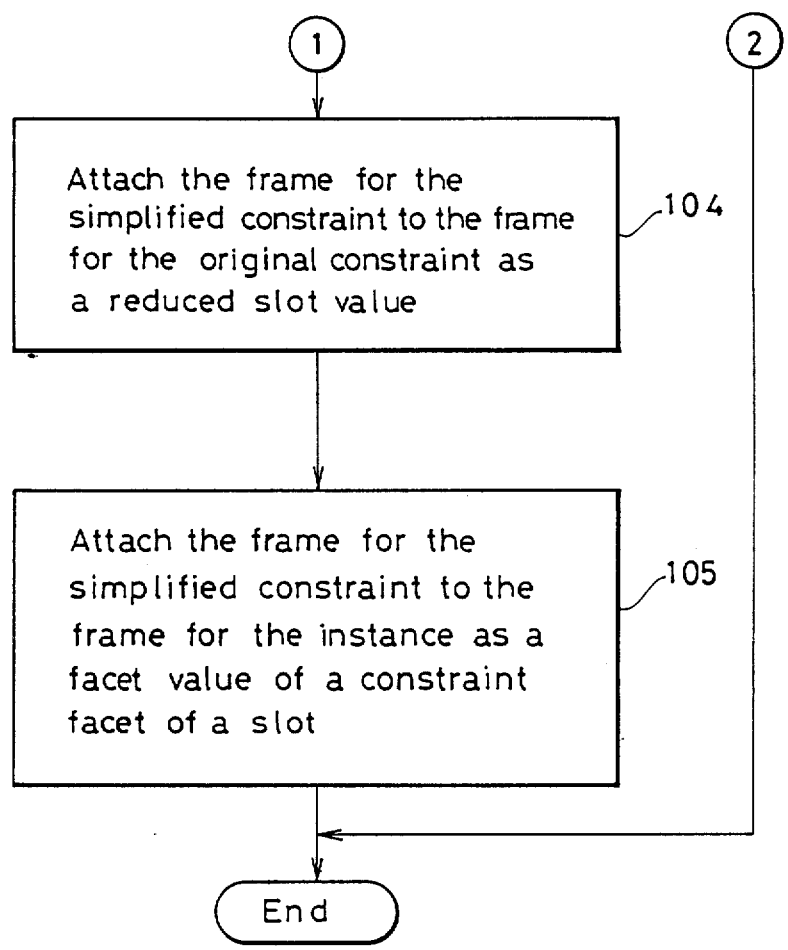

This process of simplifying a constraint is summarized in the flow-chart of FIG. 6. At step 100, an instance is generated. Then at step 101, whether a constraint on the slot value of the instance exists or not is determined. If no such constraint exists, the process terminates. If such a constraint exists, then at step 102, a frame containing the constraint is selected out and at step 103, the constraint is simplified by replacing variables by the constants of the instance and a frame representing the simplified constraint is generated. At step 104, this frame representing the simplified constraint is attached to the frame representing the original constraint as a reduced slot value. At step 105, the frame representing the simplified constraint is attached to the frame representing the instance as a facet value of a constraint facet of a slot (i.e., a pointer is attached), and the process terminates.

As explained for an exemplary situation, since constraints are represented as frames in this embodiment, they can be handled within the frame, structure of the frame-type knowledge base 3, and easy access to the frame-type knowledge base 3 is possible.

Also, in this embodiment, since constraints are simplified when slot values of slots in frames relevant are given, high efficiency in the processes of inferences can be achieved and slot values can be inferred quickly.

Furthermore, according to this invention, since constraints are represented as frames and pointers are attached to slots in frames relevant, an user merely has to create or modify constraints, and thus improved efficiency in knowledge base formation and ability to maintain consistency among slots can be achieved.

It is apparent that many modifications and variations of this embodiment may be made without departing from the novel and advantageous features of this invention. Accordingly, all such modifications and variations are intended to be included within the scope of the appended claims.

What is claimed is:

1. An apparatus for constraint-oriented inference, the apparatus comprising:
   knowledge base means containing frames comprised of slots and slot values for storing knowledge concerning objects of interest, each object being represented by one of the frames, categorized attributes being represented by slots in a frame, a particular attribute value corresponding to an object being represented by slot values in a frame, and constraints indicating relationships among slot values of the frames, the constraints stored collectively in a part of the knowledge base means; and
   constraints managing means for selecting frames and slots relevant to each constraint and for attaching a pointer to each of the selected slots to make a constraint accessible by the slots.

2. An apparatus of claim 1, wherein each constraint is stored as one of the frames in the part of the knowledge base means which stores constraints collectively.

3. An apparatus for constraint-oriented inference, said apparatus comprising:
   knowledge base means containing frames comprised of slots and slot values for storing knowledge concerning objects of interest, each object being represented by one of the frames, categorized attributes being represented by slots in a frame, a particular attribute value corresponding to an object being represented by slot values in a frame, and constraints indicating relationships among slot values of the frames, the constraints stored collectively in a part of the knowledge base means; and
   constraints managing means for selecting frames and slots relevant to each constraint and for attaching a pointer to each of the selected slots to make a constraint accessible by the slots and for generating simplified constraints in which slot values determined by processes of inference are inserted.

4. An apparatus of claim 3, wherein each constraint is stored as one of the frames in the part of the knowledge base means which stores constraints collectively.

5. An apparatus of claim 3, wherein constraints managing means includes means for selecting frames and slots relevant to each simplified constraint and for attaching a pointer to each of the selected slots to make a simplified constraint accessible by the slots.

6. A method of constraint-oriented inference comprising the steps of:
   (a) representing an object of interest by a frame in a memory;
   (b) representing categorized attributes and corresponding attribute values of the object by slots and slot values in the frame representing the object;
   (c) storing constraints indicating relationships among slot values of frames collectively in a part of a knowledge base in a memory;
   (d) selecting automatically frames and slots relevant to each constraint;
   (e) attaching automatically a pointer to each of the selected slots which makes a constraint accessible by a selected slot; and
   (f) deducing an answer to a question utilizing the frames, the slots and the constraints interactively.

7. A method of claim 6, wherein the constraints are stored in the knowledge base as frames.

8. A method of constraint-oriented inference comprising the steps of:
   (a) representing an object of interest by a frame in a memory;
   (b) representing categorized attributes and corresponding attribute values of the object by slots and slot values in the frame representing the object;
   (c) storing constraints indicating relationships among slot values of frames collectively in a part of a knowledge base in the memory;
   (d) selecting automatically frames and slots relevant to each constraint;
   (e) attaching automatically a pointer to each of the selected slots which makes a constraint accessible by a selected slot;
   (f) deducing an answer to a question utilizing the frames, the slots and the constraints interactively; and (g) generating simplified constraints by inserting into constraints slot values determined by processes of inference.

9. A method of claim 8, wherein constraints are stored in the knowledge base as one of the frames.

10. The method of claim 8, further comprising the step of:
(h) selecting automatically the frames and the slots relevant to each simplified constraint;
(i) attaching automatically a pointer to each of the selected slots which makes the simplified constraint accessible by the slots.

* * * * *